(12) United States Patent
Hüffer et al.

(10) Patent No.: US 6,495,634 B2
(45) Date of Patent: Dec. 17, 2002

(54) PROPYLENE POLYMERS

(75) Inventors: Stephan Hüffer, Ludwigshafen (DE);
Joachim Rösch, Ludwigshafen (DE);
Franz Langhauser, Ruppertsberg (DE);
Dieter Lilge, Limburgerhof (DE);
Roland Hingmann, Ladenburg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/097,865

(22) Filed: Jun. 16, 1998

(65) Prior Publication Data

US 2001/0012874 A1 Aug. 9, 2001

(51) Int. Cl.$^7$ .......................... C08L 23/12; C08L 23/14; C08F 10/06
(52) U.S. Cl. .......................... 525/240; 525/323; 526/65; 526/124.6; 526/125.3; 526/128; 526/129; 526/142; 526/348
(58) Field of Search .............. 525/240, 323; 526/65, 124.6, 125.3, 128, 129, 142, 348

(56) References Cited

U.S. PATENT DOCUMENTS

| | | |
|---|---|---|
| 4,260,710 A | 4/1981 | Staiger et al. |
| 4,455,405 A | 6/1984 | Jaggard et al. |
| 4,857,613 A | 8/1989 | Zolk et al. |
| 5,288,824 A | 2/1994 | Kerth et al. |
| 5,773,516 A * | 6/1998 | Huffer |

FOREIGN PATENT DOCUMENTS

| | | | |
|---|---|---|---|
| DE | 19529240 | * | 2/1997 |
| EP | 14 523 | | 8/1980 |
| EP | 45 977 | | 2/1982 |
| EP | 86 473 | | 8/1983 |
| EP | 171 200 | | 2/1986 |
| EP | 195497 | * | 9/1986 |
| EP | 546191 | | 6/1993 |
| EP | 597461 | | 5/1994 |
| EP | 778294 | * | 6/1997 |
| GB | 032 945 | | 6/1966 |
| GB | 2101610 | | 1/1983 |
| GB | 2 111 066 | | 6/1983 |
| ZA | 84/3561 | | 5/1984 |
| ZA | 84/3563 | | 5/1984 |
| ZA | 84/5261 | | 7/1984 |

OTHER PUBLICATIONS

Soares "Temperature Rising Elution Fractionation of Linear Polyolefins" Polymer 36(8) Apr. 1995 p 1639–1654.*
Mirabella "Impact Polypropylene Copolymers" Polymer 34(8) Apr. 1993 pp. 1729–1735.*
Patent Abstracts of Japan, vol. 97, No. 5, May 30, 1997 (English abstract of JP 09 025351, Jan. 28, 1997).
Makromol. Chem. 178, 2335–2349 (1977) Holtrup BASF Aktiengesellschaft 0050/47852.

* cited by examiner

Primary Examiner—David J. Buttner
(74) Attorney, Agent, or Firm—Keil & Weinkauf

(57) ABSTRACT

Propylene polymers containing a matrix of a propylene homopolymer and a copolymer of propylene and other alkenes, wherein, during the separation of the propylene polymers according to tacticity and comonomer distribution of the polymer chains, by first dissolving the propylene polymers in boiling xylene, then cooling the solution at a cooling rate of 10° C./h to 25° C. and thereafter, increasing the temperature, separating the propylene polymers into fractions of different solubility, either one or more of the conditions that i) more than 20% by weight of the matrix remain undissolved on further heating to 112° C. or
ii) more than 8% by weight of the matrix remain undissolved on further heating to 117° C. or
iii) more than 1% by weight of the matrix remain undissolved on further heating to 122° C.

are fulfilled by the matrix which remains undissolved on heating the cooled propylene polymer solution to 80° C., a process for the preparation of the propylene polymers, their use for the production of films, fibers or moldings and the films, fibers or moldings comprising these propylene polymers, are described.

20 Claims, No Drawings

PROPYLENE POLYMERS

The invention relates to propylene polymers containing a matrix of a propylene homopolymer and a copolymer of propylene and other alkenes, wherein, during the separation of the propylene polymers according to tacticity and comonomer distribution of the polymer chains, by first dissolving the propylene polymers in boiling xylene, then cooling the solution at a cooling rate of 10° C./h to 25° C. and thereafter, increasing the temperature, separating the propylene polymers into fractions of different solubility, either one or more of the conditions that
i) more than 20% by weight of the matrix remain undissolved on further heating to 112° C. or
ii) more than 8% by weight of the matrix remain undissolved on further heating to 117° C. or
iii) more than 1% by weight of the matrix remain undissolved on further heating to 122° C.
are fulfilled by the matrix which remains undissolved on heating the cooled propylene polymer solution to 80° C.

The present invention furthermore relates to a process for the preparation of the propylene polymers, their use for the production of films, fibers or moldings and films, fibers or moldings comprising these propylene polymers.

The unpublished German patent application P 197 10 761.3 describes propylene homopolymers which have particularly high crystallinity and are prepared using a catalyst system containing a titanium-containing solid component, an aluminum compound and an electron donor compound.

Propylene/ethylene copolymers obtainable by polymerization over Ziegler-Natta catalysts have been described in many patents. U.S. Pat. No. 4,260,710 discloses the preparation of homo- and copolymers of alk-1-enes by polymerization with the aid of Ziegler-Natta catalysts in a stirred kettle. The catalyst components used contain, inter alia, compounds of polyvalent titanium, aluminum halides and/or alkylaluminum as well as electron donor compounds, silanes, esters, ethers, ketones or lactones generally being used (EP-B 14 523, EP-B 45 977, EP-B 86 473, U.S. Pat. No. 857,613, EP-A 171 200).

Furthermore, a number of processes for the preparation of propylene/ethylene block copolymers with the aid of a Ziegler-Natta catalyst system are known (U.S. Pat. No. 4,454,299, U.S. Pat. No. 4,455,405, ZA-B 0084/3561, ZA-B 0084/3563, ZA-B 0084/5261, GB-B 1 032 945, DE-A 38 27 565), in which first gaseous propylene is polymerized in a first reaction zone and the homopolymer obtainable therefrom is then brought into a second reaction zone where a mixture of ethylene and propylene is polymerized thereon. The process is usually carried out at superatmospheric pressure and in the presence of hydrogen as a molecular weight regulator. The copolymers obtainable generally have good impact strength and rigidity.

By varying the amount of the homopolymer obtained in the first stage and of the copolymer to be polymerized on in the second stage, it is possible to control the impact strength of the propylene/ethylene block copolymers. However, inevitably a decrease in the rigidity is associated with an increase in the impact strength and, conversely, a decrease in the impact strength with an increase in the rigidity. For some applications of plastics, however, it is necessary to increase the rigidity without reducing the impact strength or to improve the impact strength without reducing the rigidity. Moreover, the polymers should have a very low chlorine content and, for economic reasons, a further increase in the productivity of the catalyst system used is of interest.

It is an object of the present invention to provide propylene polymers which have a further improved ratio of rigidity to toughness, possess a low chlorine content and furthermore can be prepared by a process with increased productivity.

We have found that this object is achieved by the propylene polymers defined at the outset and a process for their preparation, their use for the production of films, fibers or moldings and the films, fibers or moldings comprising these propylene polymers.

The novel propylene polymers are generally present in a form comprising at least two phases. They contain a continuous phase of a propylene homopolymer, which is referred to as the matrix. This matrix phase is semicrystalline, ie. it consists of a crystallized fraction, ie. the crystallites, and an amorphous fraction. According to the invention, the term propylene homopolymer is also intended to mean those propylene polymers in which minor amounts of other alkenes are copolymerized units, the propylene homopolymers generally containing less than 2, in particular less than 1, % by weight of other alkenes. The matrix of the novel propylene homopolymers preferably contains only propylene as a monomer.

The novel propylene polymers preferably contain from 50 to 92% by weight of the matrix-forming propylene homopolymer. Particularly preferably, the amount of the matrix is from 60 to 90% by weight.

Furthermore, the novel propylene polymers contain a copolymer of propylene and other alkenes, which is present as a separate phase from the matrix and exhibits very low or no crystallinity. This copolymer referred to as a rubber or elastomer contains, as a rule, from 20 to 85% by weight of propylene. The propylene content of the copolymer is preferably from 35 to 80, in particular from 45 to 70, % by weight. Depending on the chosen ratio of matrix to elastomer, the phase of the copolymer of propylene and other alkenes is present in disperse form in the matrix or is likewise continuous and hence cocontinuous with the matrix.

The other alkenes which are copolymerized with propylene are to be understood as meaning preferably alk-1-enes of up to 10 carbon atoms. Ethylene, but-1-ene, pent-1-ene, hex-1-ene, hept-1-ene and oct-1-ene or mixtures of these comonomers are particularly suitable, ethylene and but-1-ene being preferred. In the case of the copolymers acting as elastomers, unconjugated dienes, such as ethylidenenorbornene, dicyclopentadiene or 1,4-hexadiene, may also be present as other alkenes and are then copolymerized, as a rule, with ethylene and propylene.

The novel propylene polymers preferably contain from 8 to 50% by weight of the copolymer of propylene and other alkenes. Particularly preferably, the amount of the elastomer phase is from 10 to 40% by weight.

In addition to the essential components, the novel propylene polymers may also contain further homo- or copolymers of alkenes, for example homo- or copolymers of ethylene or polyisobutylene. For example, the amount of the further homo- or copolymers of alkenes may be from 0 to 30% by weight, based on the total propylene polymer.

One method for analyzing propylene polymers with regard to the fractions of polymer chains of different tacticity and different comonomer incorporation is TREF (Temperature Rising Elution Fractionation), in which the dissolution temperature of the polymer fraction corresponds to its average length of sequences built up without defects. To carry out the TREF, the propylene polymers are first dissolved in hot, preferably boiling xylene, the solution is then cooled at a constant cooling rate and thereafter the propylene polymers are separated, with increasing temperature, into fractions of different crystallinity. The composition of the propylene polymers can be described in terms of the fraction which remains undissolved on heating the cooled propylene polymer solution to a defined temperature.

In the fractionation of mixtures of propylene homopolymers and copolymers of the propylene with other alkenes, the polymer chains composed of different monomers first go into solution with increasing dissolution temperature, the dissolution temperature being lower the shorter the average sequence lengths of a monomer type. This means that first the elastomer fraction goes into solution and then, at higher temperatures, the matrix, which can be separated again with regard to the average isotactic sequence length of the polymer chains. It has been found that the polymer fractions which go into solution up to and including 80° C. can be assigned to the elastomer phase, whereas the fraction which remains undissolved at 80° C. and goes into solution only at higher temperatures originates from the matrix.

The novel propylene polymers have a high content of polymer chains with long defect-free isotactic propylene sequences in the matrix. Regarding the matrix, ie. that fraction of the propylene polymers which remains undissolved on heating the cooled polymer solution to 80° C., the propylene polymers fulfill either one or preferably two or all of the following conditions i) to iii):

i) More than 20, preferably more than 30, in particular more than 40, % by weight of the matrix remain undissolved on further heating to 112° C.

ii) More than 8, preferably more than 12, in particular more than 16, % by weight of the matrix remain undissolved on further heating to 117° C.

iii) More than 1, preferably more than 2, in particular more than 3, % by weight of the matrix remain undissolved on further heating to 122° C.

To determine according to the invention the composition of the propylene polymers, TREF is carried out in the following manner:

1–10 g of the propylene polymer are dissolved in a sufficient amount of boiling xylene to give a 0.5–2% strength by weight solution. The boiling solution is then cooled with a linear cooling rate of from 2 to 15, preferably from 10 to 25, ° C./h, or a lower temperature, the major part of the polymer being precipitated. The crystal suspension is then transferred to a thermostatable extraction apparatus which corresponds to that described by W. Holtup in Makromol. Chem. 178 (1977), 2355, and is heated to the first elution temperature. The polypropylene crystals are then extracted for at least 10 minutes at this temperature with vigorous mixing. Thereafter, the polymer solution is discharged while the polymer crystals remain behind in the extractor. The dissolved polymer is precipitated in cold acetone (temperature <0° C.), and the precipitate is filtered off and dried under reduced pressure until the weight is constant.

The extractor is then heated to the next elution temperature, and xylene at the same temperature is added in the same amount as that used for dissolution. Extraction is then carried out once again for at least 10 minutes with vigorous mixing, the polymer solution is discharged, the dissolved polymer is precipitated in cold acetone and the precipitate is filtered off and dried. These steps are repeated until the total polymer has dissolved.

The elastomer fraction corresponds to the fractions dissolved up to and including 80° C., and the matrix fraction is the sum of all fractions which dissolve at higher elution temperatures. The matrix fraction insoluble at the individual temperatures is obtained from the ratio of the TREF fraction at the corresponding temperature of the total matrix fraction.

Since the matrix accounts for only a part of the novel propylene polymers, the fractions which remain undissolved on heating to 112° C., 117° C. and 122° C. are, based on the total propylene polymer, naturally smaller and are dependent on the ratio of matrix fraction to elastomer fraction.

The novel propylene polymers can be prepared by mixing the melts of the fractions separately polymerized beforehand. Mixing is then effected in a manner known per se, for example by means of an extruder. The polymer blends prepared in such a manner may also contain polymers which are obtainable with other catalyst systems suitable for the preparation of the matrix, for example polyisobutylenes or ethylene/propylene/diene/(EPDM) rubbers.

However, the novel propylene polymers are preferably prepared in a multistage polymerization process, as a rule the matrix being polymerized in a first stage and a copolymer of propylene with other alkenes then being polymerized thereon in a second stage. In addition, it is possible in subsequent stages to polymerize on further homo- or copolymers of alkenes. Particularly suitable alkenes for such processes are alk-1-enes of up to 10 carbon atoms.

In the process likewise according to the invention, the propylene polymers are prepared by polymerization of propylene at from 50 to 120° C. and from 15 to 40 bar in a first polymerization stage and subsequent copolymerization of propylene and other alk-1-enes of up to 10 carbon atoms at from 30 to 100° C. and from 5 to 40 bar in a second polymerization stage in the presence of a Ziegler-Natta catalyst system which contains, as active components, a titanium-containing solid component a) which is obtained by reacting a titanium halide with a chlorine-free compound of magnesium, an inorganic oxide as carrier, a $C_1$–$C_8$-alkanol and an electron donor compound and, as cocatalysts, an aluminum compound b) and a further electron donor compound c).

For the preparation of the titanium-containing solid component a), the titanium halides used are the halides of trivalent or tetravalent titanium, for example $TiBr_3$, $TiBr_4$, $TiCl_3$ or $TiCl_4$, or alkoxytitanium halides, such as $Ti(OCH_3)Cl_3$, $Ti(OC_2H_5)Cl_3$, $Ti(O\text{-}iso\text{-}C_3H_7)Cl_3$, $Ti(O\text{-}n\text{-}C_4H_9)Cl_3$, $Ti(OC_2H_5)Br_3$, $Ti(O\text{-}n\text{-}C_4H_9)Br_3$, $Ti(OCH_3)_2Cl_2$, $Ti(OC_2H_5)_2Cl_2$, $Ti(O\text{-}n\text{-}C_4H_9)_2Cl_2$, $Ti(OC_2H_5)_2Br_2$, $Ti(OCH_3)_3Cl$, $Ti(OC_2H_5)_3Cl$, $Ti(O\text{-}n\text{-}C_4H_9)_3Cl$ or $Ti(OC_2H_5)_3Br$, the titanium halides which contain only halogen in addition to titanium and among these in particular the titanium chlorides and especially titanium tetrachloride, being preferred. According to the invention, the titanium halides may also be used as mixtures of one another or in mixtures with further titanium compounds. Examples of suitable further titanium compounds are titanium alcoholates, such as $Ti(OCH_3)_4$, $Ti(OC_2H_5)_4$ or $Ti(O\text{-}n\text{-}C_4H_9)_4$. Preferably, the titanium halides are used alone.

Furthermore, a chlorine-free compound of magnesium or a mixture of said compounds is used in the preparation of the titanium-containing solid component. Chlorine-free compounds of magnesium are to be understood according to the invention as meaning those which contain no halogen in their structural formula. However, the amounts of halogen contained as impurities in the novel chlorine-free compounds of magnesium should not exceed 5, in particular 2, % by weight. Suitable chlorine-free compounds of magnesium are in particular alkylmagnesiums and arylmagnesiums as well as alkoxymagnesium and aryloxymagnesium compounds, di-$C_1$–$C_{10}$-alkylmagnesium compounds preferably being used. Examples of novel chlorine-free compounds of magnesium are diethylmagnesium, di-n-propylmagnesium, di-isopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, di-isopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. Among these, n-butylethylmagnesium and n-butyloctylmagnesium are particularly preferred.

In addition, the titanium-containing solid component a) contains at least one inorganic oxide as carrier. As a rule, a finely divided inorganic oxide which has a median particle diameter from 5 to 200 μm, preferably from 15 to 100 μm and in particular from 20 to 70 μm, is used as carrier. The median particle diameter is to be understood here as meaning the volume-related median value of the particle size distribution determined by Coulter Counter Analysis according to ASTM Standard D 4438.

Preferably, the particles of the finely divided inorganic oxide are composed of primary particles which have a median diameter of the primary particles of from 1 to 20 μm, in particular from 3 to 10 μm. The primary particles are porous, granular oxide particles which in general are obtained by milling a hydrogel of the inorganic oxide. It is also possible to sieve the primary particles before their further processing.

Furthermore, the inorganic oxide preferably to be used is also characterized by the fact that it has cavities or channels with an average diameter of from 0.1 to 20 μm, in particular from 1 to 15 μm, whose macroscopic volume fraction is from 5 to 30%, in particular from 10 to 30%, based on the total particle.

The median diameter of the primary particles and the macroscopic volume fraction of the cavities and channels of the inorganic oxide are advantageously determined by image analysis with the aid of scanning electron microscopy or electron probe microanalysis, in each case on particle surfaces and on particle cross-sections of the inorganic oxide. The electron micrographs obtained are evaluated and the median diameter of the primary particles and the macroscopic volume fraction of the cavities and channels are determined therefrom. The image analysis is preferably carried out by conversion of the electron microscopy data into a gray scale binary image and digital evaluation by means of a suitable computer program.

The inorganic oxide preferably to be used may be retained, for example, by spray-drying the milled hydrogel, which is mixed with water or an aliphatic alcohol for this purpose. Such finely divided inorganic oxides are also commercially available.

Finely divided inorganic oxide further usually has a pore volume of from 0.1 to 10, preferably 1.0 to 4.0, cm³/g and a specific surface area of from 10 to 1000, preferably from 100 to 500, m²/g, these being understood as the values determined by mercury porosymmetry according to DIN 66133 and by nitrogen adsorption according to DIN 66131.

The pH of the inorganic oxide, ie. the negative logarithm to the base 10 of the proton concentration, is preferably from 1 to 6.5, in particular from 2 to 6, particularly preferably from 3.5 to 5.5.

Particularly suitable inorganic oxides are the oxides of silicon, of aluminum, of titanium or of one of the metals of main groups I and II of the Periodic Table. Silica (silica gel) is a very preferably used oxide in addition to alumina or magnesium oxide or a sheet silicate. Mixed oxides, such as aluminum silicates or magnesium silicates, may also be used.

The inorganic oxides used as carrier contain hydroxyl groups on their surface. By elimination of water, it is possible to reduce or completely eliminate the content of OH groups. This can be achieved by thermal or chemical treatment. Thermal treatment is usually carried out by heating the inorganic oxide for from 1 to 24, preferably from 2 to 20, in particular from 3 to 12, hours to 250 to 900° C., preferably 600 to 800° C. The hydroxyl groups may also be removed by chemical methods, by treating the inorganic oxides with conventional drying agents, such as SiCl$_4$, chlorosilanes or alkylaluminums. Preferably used inorganic oxides contain from 0.5 to 5% by weight of water. The water content is conventionally determined by drying the inorganic oxide at 160° C. under atmospheric pressure until the weight is constant. The weight decrease corresponds to the original water content.

In the preparation of the titanium-containing solid component a), preferably from 0.1 to 1.0, in particular from 0.2 to 0.5, mol of the chlorine-free compound of magnesium is used per mole of the inorganic oxide.

Furthermore, C$_1$–C$_8$ alkanols, such as methanol, ethanol, n-propanol, isopropanol, n-butanol, sec-butanol, tert-butanol, isobutanol, n-hexanol, n-heptanol, n-octanol or 2-ethylhexanol or mixtures thereof, are used in the preparation of the titanium-containing solid component a). Ethanol is preferably used.

The titanium-containing solid component a) furthermore contains electron donor compounds, for example mono- or polyfunctional carboxylic acids, carboxylic anhydrides or carboxylic esters, as well as ketones, ethers, alcohols, lactones or organophosphorus or organosilicon compounds.

Preferably used electron donor compounds within the titanium-containing solid component are carboxylic acid derivatives and in particular phthalic acid derivatives of the formula (II)

(II)

where X and Y are each chlorine, bromine or C$_1$–C$_{10}$-alkoxy or together are oxygen in an anhydride function. Particularly preferred electron donor compounds are phthalic esters, X and Y being C$_1$–C$_8$-alkoxy, for example methoxy, ethoxy, n-propyloxy, isopropyloxy, n-butyloxy, sec-butyloxy, isobutyloxy or tert-butyloxy. Examples of preferably used phthalic esters are diethyl phthalate, di-n-butyl phthalate, di-isobutyl phthalate, dipentyl phthalate, dihexyl phthalate, di-n-heptyl phthalate, di-n-octyl phthalate and di-2-ethylhexyl phthalate.

Other preferred electron donor compounds within the titanium-containing solid component are diesters of 3- or 4-membered, unsubstituted or substituted cycloalkyl-1,2-dicarboxylic acids, and monoesters of substituted benzophenone-2-carboxylic acids or substituted benzophenone-2-carboxylic acids. Hydroxy compounds used in these esters are the alkanols usually employed in esterification reactions, for example C$_1$–C$_{15}$-alkanols or C$_5$–C$_7$-cycloalkanols, which in turn may carry one or more C$_1$–C$_{10}$-alkyl groups, and furthermore C$_6$–C$_{10}$-phenols.

Mixtures of different electron donor compounds may also be used.

The titanium-containing solid component a) can be prepared by methods known per se which are described, for example, in EP-A 171 200, GB-A 2 111 066, U.S. Pat. No. 4,857,613 and U.S. Pat. No. 5,288,824. However, in the first stage of its preparation, the chlorine-free compound of magnesium in an inert solvent is used and is reacted with the carrier and $C_1$–$C_8$-alkanol to give a chlorine-free intermediate which is advantageously further processed without purification or extraction.

In the preparation of the titanium-containing solid component a), the following two-stage process is preferably used:

In the first stage, a solution of the chlorine-free compound of magnesium is first added to the inorganic oxide in an inert solvent, preferably a liquid alkane or an aromatic hydrocarbon, eg. toluene or ethylbenzene, after which this mixture is allowed to react for from 0.5 to 5 hours at from 10 to 120° C., as a rule with stirring. The $C_1$–$C_8$-alkanol is then added in at least a 1.3-fold, preferably from 1.6- to 3-fold, in particular from 1.8- to 2.0-fold, molar excess, based on the magnesium-containing compound, usually with continuous stirring at from −20 to 80° C., preferably from 0 to 40° C. This results in the formation of a chlorine-free intermediate, which is preferably further processed without purification or extraction. After from about 10 to 120, preferably from about 20 to 60, minutes, the titanium halide and the electron donor compound are added to this intermediate at from 10 to 50° C. From 1 to 15, preferably 2 to 5, mol of the titanium halide and from 0.01 to 1, in particular from 0.3 to 0.7, mol of the electron donor compound are used per mole of magnesium of the solid obtained from the first stage. This mixture is allowed to react for at least 10, preferably 30, in particular from 45 to 90, minutes at from 10 to 150° C., in particular from 60 to 130° C., in general with stirring, and the solid substance thus obtained is then filtered off and washed with a $C_7$–$C_{10}$-alkylbenzene, preferably with ethylbenzene.

In the second stage, the solid obtained from the first stage is extracted at from 100 to 150° C. with excess titanium tetrachloride or with a solution of titanium tetrachloride in an inert solvent, preferably a $C_7$–$C_{10}$-alkylbenzene, which solution is present in excess, the solvent containing at least 5% by weight of titanium tetrachloride. The extraction is carried out as a rule for at least 30 minutes. The product is then washed with a liquid alkane until the titanium tetrachloride content of the wash liquid is less than 2% by weight.

The titanium-containing solid component a) obtainable in this manner is used with cocatalysts as the Ziegler-Natta catalyst system. Suitable cocatalysts are aluminum compounds b) and further electron donor compounds c).

Examples of suitable aluminum compounds b) are trialkylaluminum, and those compounds in which an alkyl group has been replaced by an alkoxy group or by a halogen atom, for example by chlorine or bromine. The alkyl groups may be identical or different. Linear or branched alkyl groups are suitable. Preferably used trialkylaluminum compounds are those whose alkyl groups are each of 1 to 8 carbon atoms, for example trimethylaluminum, triethylaluminum, triisobutylaluminum, trioctylaluminum or methyldiethylaluminum or mixtures thereof.

In addition to the aluminum compound b), electron donor compounds c), for example mono- or polyfunctional carboxylic acids, carboxylic anhydrides and carboxylic esters, as well as ketones, ethers, alcohols, lactones and organophosphorus and organosilicon compounds are used as the further cocatalyst, it being possible for the electron donor compounds c) to be identical to or different from the electron donor compounds used for the preparation of the titanium-containing solid component a). Preferred electron donor compounds are organosilicon compounds of the formula (I)

$$R^1{}_n Si(OR^2)_{4-n} \qquad (I)$$

where the radicals $R^1$ are identical or different and are each $C_1$–$C_{20}$-alkyl, 5- to 7-membered cycloalkyl which in turn may be substituted by $C_1$–$C_{10}$-alkyl, $C_6$–$C_{18}$-aryl or $C_6$–$C_{18}$-aryl-$C_1$–$C_{10}$-alkyl, the radicals $R^2$ are identical or different and are each $C_1$–$C_{20}$-alkyl and n is the integer 1, 2 or 3. Particularly preferred compounds are those in which $R^1$ is $C_1$–$C_8$-alkyl or 5- to 7-membered cycloalkyl, $R^2$ is $C_1$–$C_4$-alkyl and n is 1 or 2.

Among these compounds, dimethoxydiisopropylsilane dimethoxyisobutylisopropylsilane, dimethoxydiisobutylsilane, dimethoxydicyclopentylsilane, dimethoxydicyclohexylsilane, dimethoxycyclohexylmethylsilane, dimethoxyisopropyl-tert-butylsilane, dimethoxyisobutyl-sec-butylsilane and dimethoxyisopropyl-sec-butylsilane are particularly noteworthy.

The compounds b) and c) acting as cocatalysts may be allowed to act individually, in succession in any desired order or together as a mixture on the titanium-containing solid component a). This is usually effected at from 0 to 150° C., in particular from 20 to 90° C., and from 1 to 100, in particular from 1 to 40 bar.

The cocatalysts b) are preferably used in such an amount that the atomic ratio of aluminum from the aluminum compound b) to titanium from the titanium-containing solid component a) is from 10:1 to 800:1, in particular from 20:1 to 200:1.

In the process leading to the novel propylene polymers and likewise according to the invention, the molar ratio of the aluminum compound b) to the further electron donor compound c) is adjusted to from 1.5:1 to 9:1, in particular 2:1 to 8:1. If a molar ratio greater than 9:1 is used, the stereospecificity of the resulting propylene homopolymers is in general insufficient. If the ratio is less than 1.5:1, the process is generally not very advantageous for economic reasons, in particular owing to the large amounts of further electron donor compound c) then used.

Said process can be carried out in the conventional reactors used for the polymerization of $C_2$–$C_{10}$-alk-1-enes, either batchwise or, preferably, continuously, inter alia in solution, as suspension polymerization or, preferably, as gas-phase polymerization. Suitable reactors include continuously operated stirred reactors, loop reactors or fluidized-bed reactors. If a batchwise procedure is used, polymerization is effected in the stages in succession by varying the reaction conditions. As a rule, however, the continuous procedure is used, the matrix initially being prepared in the first stage in one or more reactors and then the elastomer phase being prepared in one or more further reactors. In addition, it is possible to polymerize on further homo- or copolymers of $C_2$–$C_{10}$-alk-1-enes in subsequent stages. It is also possible to combine different reactor types. In a particularly preferred embodiment, the preparation of the copolymers is carried out in a multistage, in particular two-stage, gas-phase process, the reactors used being continuously operated stirred kettles which contain a fixed bed of finely divided polymer which is usually kept in motion by suitable stirring apparatuses.

Said process is carried out by polymerizing propylene or a monomer mixture comprising propylene and minor amounts of other alk-1-enes of up to 10 carbon atoms at from 50 to 120° C., preferably from 60 to 90° C., and from 15 to 40, preferably from 20 to 35, bar for the preparation of the matrix in the first polymerization stage. The average residence time is as a rule from 1.0 to 3.0, preferably from 0.5 to 5, hours. The reaction conditions are preferably chosen so that, in the first polymerization stage, from 0.05 to 2, preferably from 0.1 to 1.5 kg of the matrix are formed per mole of the aluminum component b). Polymerization is usually carried out in the presence of hydrogen, a partial pressure ratio of propylene to hydrogen of, preferably, from 30:1 to 180:1, in particular from 30:1 to 150:1, being established.

The propylene polymer obtained is discharged together with the catalyst from the first polymerization stage and is introduced into the second polymerization stage, where a copolymer of propylene and other alk-1-enes of up to 10 carbon atoms is polymerized onto said propylene polymer. The amount of added monomers is as a rule such that the ratio of the partial pressure of propylene to that of the other alk-1-enes of up to 10 carbon atoms is from 0.5:1 to 20:1, in particular from 1.0:1 to 10:1. Moreover, by a suitable choice of the reaction parameters, the weight ratio of the monomers reacted in the first polymerization stage to those reacted in the second polymerization stage is usually established to be from 0.5:1 to 20:1, in particular from 1.0:1 to 15:1.

The polymerization is effected in the second polymerization stage at from 30 to 100° C., preferably from 50 to 90° C., and from 5 to 40, preferably 10 to 35, bar. The average residence time of the reaction mixture is as a rule from 0.5 to 5, preferably 1.0 to 3.0, hours. The pressure in the second polymerizaton stage is preferably at least 3 bar below the pressure of the first polymerization stage. In the second polymerization stage, too, the polymerization is preferably carried out in the presence of hydrogen, the ratio of the partial pressure of propylene to that of hydrogen being as a rule from 100:1 to 5:1, in particular from 60:1 to 10:1.

It may also be advisable to add a $C_1$–$C_8$-alkanol, in particular a $C_1$–$C_4$-alkanol, to the reaction mixture of the second polymerization stage, which alkanol influences the activity of the Ziegler-Natta catalyst. Alkanols suitable for this purpose are, for example, methanol, ethanol, n-propanol, n-butanol and very particularly isopropanol. The amount of $C_1$–$C_8$-alkanol is in general such that the molar ratio of the $C_1$–$C_8$-alkanol to the aluminum compound b) serving as cocatalyst is from 0.01:1 to 10:1, in particular from 0.02:1 to 5:1.

The weight average molar masses of the novel copolymers of propylene are as a rule from 10,000 to 1,000,000 g/mol and the melt flow rates (MFR) are from 0.1 to 100, preferably from 0.2 to 20, g/10 min. The melt flow rate (MFR) corresponds to the amount of polymer which is forced, in the course of 10 minutes at 230° C. and under a weight of 2.16 kg, out of the test apparatus standardized according to ISO 1133.

Compared with the propylene polymers known to date, the novel propylene polymers have a higher proportion of polymer chains with long defect-free isotactic polymer sequences in the matrix. This manifests itself, for example, in an improved ratio of rigidity to toughness. Moreover, the novel copolymers also have reduced chlorine contents. The productivity of the process used for the preparation of these copolymers is substantially higher compared with the known processes.

Owing to their good mechanical properties, the novel propylene polymers are particularly suitable for the production of films, fibers or moldings.

EXAMPLES

The following tests were carried out for characterizing the propylene polymers:

Determination of the xylene-soluble fraction:
   According to ISO Standard 1873-1:1991.
Determination of the DSC melting point:
   According to ISO Standard 3146 with a heating rate of 10° C. per minute.
Determination of the melt flow rate (MFR):
   According to ISO Standard 1133, at 230° C. and under a weight of 2.16 kg.
Determination of productivity:
   The productivity is the amount of polymer in grams which was obtained per gram of titanium-containing solid component a) used.
Fractionation by crystallinity:
   The separation of the propylene polymer with respect to the crystallinity was carried out by preparative fractionation by Temperature Rising Elution Fractionation (TREF). For this purpose, 5 g of each of the propylene polymers were dissolved in 400 ml of boiling xylene and the solution was then cooled linearly to 25° C. at a cooling rate of 10° C./h, the major part of the polymer being precipitated.

The crystal suspension was transferred to a thermostatable 500 ml extraction apparatus, which corresponds to that described by W. Holtup in Makromol. Chem. 178, (1977) 2335, and was heated to the first elution temperature. The polypropylene crystals were extracted at this temperature for 15 minutes with vigorous mixing. Thereafter, the polymer solution was discharged while the polymer crystals remained behind in the extractor. The dissolved polymer was precipitated in cold acetone (temperature <0° C.) and the precipitate was filtered off and dried for from 4 to 5 hours at 100° C. under reduced pressure.

The extractor was then heated to the next elution temperature and 400 ml of xylene at the same temperature were added. Extraction was carried out once again for 15 minutes with vigorous mixing, the polymer solution was discharged, the dissolved polymer was precipitated in cold acetone and the precipitate was filtered off and dried.

These steps were repeated until the total polymer had dissolved. The polymer fractions recovered by precipitating the TREF fractions were in each case from 99.0 to 100% by weight. To facilitate further calculations, the TREF fractions shown in Table 2 are based on the recovered fractions, ie. the sum of the TREF fractions is 100.0% by weight.

The elastomer fraction corresponds to the amounts dissolved up to and including 80° C. and the matrix fraction is the sum of all fractions which have dissolved at higher elution temperatures. The matrix fraction insoluble at individual temperatures is determined from the ratio of the TREF fraction at the corresponding temperature to the total matrix fraction.

Determination of the modulus of elasticity (tensile modulus of elasticity):
   According to ISO Standard 527-2, at a measuring temperature of 23° C.
Determination of the notched impact strength:
   As Izod notched impact strength according to ISO Standard 180/1A Determination of the chlorine content:

The chlorine content of the polymers was determined by microcoulometric determination according to DIN 51408, Part 2.

Determination of the median particle diameter:

To determine the median particle diameter of the silica gel, the particle size distribution of the silica gel particles was determined by Coulter Counter Analysis according to ASTM Standard D 4438 and the volume-related median value calculated therefrom.

Determination of the pore volume:

By mercury porosymmetry according to DIN 66133

Determination of the specific surface area:

By nitrogen adsorption according to DIN 66131

Determination of the water content:

To determine the water content, 5 g of silica gel were dried at 160° C. under atmospheric pressure for 15 minutes (weight constancy). The weight decrease corresponds to the original water content.

Determination of the macroscopic volume fraction of the cavities and channels:

The median particle size of the primary particles and the macroscopic volume fraction of the cavities and channels of the silica gel used were determined with the aid of scanning electron microscopy or electron probe microanalysis, in each case on particle surfaces and particle cross-sections of the silica gel. The electron micrographs obtained were converted into a gray scale binary image and digitally evaluated by means of the software package Analysis from SIS.

Example 1

Preparation of the Titanium-Containing Solid Component $a_1$)

In a first stage, a solution of n-butyloctylmagnesium in n-heptane was added to finely divided, spherical silica gel ($SiO_2$), which had a median particle diameter of 45 µm, a pore volume of 1.5 cm$^3$/g, a specific surface area of 260 m$^2$/g and a water content of 2.7% by weight, 0.3 mol of the magnesium compound being used per mole of $SiO_2$. The finely divided silica gel had a pH of 5.5 and was additionally characterized by a median particle size of the primary particles of 7 µm and by cavities and channels having an average diameter of 5–10 µm, the macroscopic volume fraction of the cavities and channels being about 25%, based on the total particle. The solution was stirred for 30 minutes at 95° C. and then cooled to 20° C., after which the 1.8-fold molar amount, based on the organomagnesium compound, of ethanol was added with cooling, the reaction temperature being kept below 45° C. After 45 minutes, 4.2 mol of titanium tetrachloride and 0.6 mol of di-n-butyl phthalate were added, based in each case on 1 mole of magnesium, to the chlorine-free intermediate without purification or extraction step and with continuous stirring. Thereafter, stirring was carried out for 1 hour at 100° C. and the solid substance thus obtained was filtered off and washed several times with ethylbenzene.

The solid product obtained therefrom was extracted for 90 minutes in a second stage at 125° C. with a 10% strength by volume solution of titanium tetrachloride in ethylbenzene. Thereafter, the solid product was separated from the extracting agent by filtration and was washed with n-heptane until the extracting agent contained only 0.3% by weight of titanium tetrachloride.

The titanium-containing solid component $a_1$) thus prepared contained 3.8% by weight of Ti 7.2% by weight of Mg 28.1% by weight of Cl.

Polymerization

The preparation of the propylene polymers was carried out in a cascade of two vertically stirred gas-phase reactors connected in series and having an effective volume of 200 l each, in the presence of hydrogen as a molecular weight regulator. Both reactors contained an agitated solid bed of finely divided polymer.

Gaseous propylene was passed into the first gas-phase reactor and polymerized continuously under the temperature and pressure conditions shown in Table 1. This was carried out with an average residence time of about 1.5 hours, 1.4 g of the titanium-containing solid component $a_1$), 90 mmol of triethylaluminum b) and 22.5 mmol of dimethoxydicyclopentylsilane c) being used per hour.

The propylene homopolymer obtained after the end of the gas phase polymerization was then transferred, together with still active catalyst components, to the second gas-phase reactor. There a mixture of propylene and ethylene was continuously polymerized onto this propylene homopolymer under the conditions shown in Table 1 below (pressure, temperature, partial pressure ratio of propylene to ethylene, weight ratio of converted monomers of the first stage to converted monomers of the second stage) in the presence of isopropanol as a regulator.

Comparison Example A

Preparation of the Titanium-Containing Solid Component $a_A$)

In a first stage, a solution of n-butyloctylmagnesium in n-heptane was added to the finely divided, spherical silica gel also used in Example 1, 0.3 mol of the magnesium compound being used per mole of $SiO_2$. The solution was stirred for 45 minutes at 95° C. and then cooled to 20° C., after which the 10-fold molar amount, based on the organomagnesium compound, of hydrogen chloride was passed in. After 60 minutes, 3 mol of ethanol per mole of magnesium were added to the reaction product with continuous stirring. This mixture was stirred for 0.5 hour at 80° C., after which 7.2 mol of titanium tetrachloride and 0.5 mol of di-n-butyl phthalate, based in each case on 1 mol of magnesium, were added. Stirring was then carried out for 1 hour at 100° C., and the solid substance thus obtained was filtered off and washed several times with ethylbenzene.

The solid product obtained therefrom was extracted for 3 hours at 125° C. with a 10% strength by volume solution of titanium tetrachloride in ethylbenzene. Thereafter, the solid product was separated from the extracting agent by filtration and was washed with n-heptane until the extracting agent contained only 0.3% by weight of titanium tetrachloride.

The titanium-containing solid component $a_A$) thus prepared contained 3.5% by weight of Ti 7.4% by weight of Mg 28.2% by weight of Cl.

Polymerization

In a procedure similar to Example 1 according to the invention, a propylene homopolymer was initially prepared in the first reactor, said homopolymer was then transferred to the second reactor and a mixture of propylene and ethylene was polymerized there onto the propylene homopolymer. This was effected under reaction conditions similar to those described in Example 1, except that the titanium-containing solid component $a_A$) was used. 2.2 g of titanium-containing solid component $a_A$), 90 mmol of triethylaluminum b) and 22.5 mmol of dimethoxydicyclopentylsilane c) were used per hour.

Examples 2 to 4

The novel Example 1 was repeated with the same catalyst system, the reaction conditions of pressure, temperature, partial pressure ratio of propylene to ethylene and weight ratio of converted monomers of the first stage to converted monomers of the second stage now being varied according to Table 1.

Comparative Examples B to D

The novel Examples 2 to 4 were repeated similarly in each case, except that the titanium-containing solid component $a_A$) was used in each case.

Table 1 below shows the respective reaction conditions both for the novel Examples 1 to 4 and for the Comparative Examples A to D.

Table 2 shows, for the novel Examples 1 to 4 and the Comparative Examples A to D, the following properties of the homopolymer matrix, determined after the first polymerization stage: xylene-soluble fraction, melting point and productivity.

In addition, Table 2 contains the proportions of the TREF fractions determined for the end product, and the elastomer and matrix contents calculated therefrom as well as the xylene-insoluble fractions, based on the total polymer and on the matrix. The melt flow rate (MFR) of the end product, the rigidity (tensile modulus of elasticity), the Izod notched impact strengths at −20° C. and −40° C. and the chlorine content of the polymer are also shown.

TABLE 1

|  | Example 1 | Comp. Ex. A | Example 2 | Comp. Ex. B | Example 3 | Comp. Ex. C | Example 4 | Comp. Ex. D |
|---|---|---|---|---|---|---|---|---|
| Polymerization stage 1: | | | | | | | | |
| Pressure [bar] | 30 | 30 | 32 | 32 | 32 | 32 | 30 | 30 |
| Temperature [° C.] | 80 | 80 | 80 | 80 | 80 | 80 | 80 | 80 |
| Molar ratio aluminum compound b)/electron donor C) | 4:1 | 4:1 | 4:1 | 4:1 | 4:1 | 4:1 | 4:1 | 4:1 |
| Polymerization stage 2: | | | | | | | | |
| Pressure [bar] | 20 | 20 | 20 | 20 | 23 | 23 | 20 | 20 |
| Temperature [° C.] | 70 | 70 | 70 | 70 | 70 | 70 | 70 | 70 |
| Partial pressure ratio propylene:ethylene | 2.0 | 1.8 | 2.1 | 1.9 | 2.5 | 2.27 | 2.5 | 2.3 |
| Weight ratio converted monomers of 1st stage:converted monomers of 2nd stage | 9.0 | 9.2 | 5.9 | 5.8 | 4.0 | 3.8 | 2.3 | 2.3 |
| Addition of isopropanol [mmol/h] | 320 | 252 | 224 | 155 | 150 | 104 | 74 | 50 |

TABLE 2

|  | Example 1 | Comp. Ex. A | Example 2 | Comp. Ex. B | Example 3 | Comp. Ex. C | Example 4 | Comp. Ex. D |
|---|---|---|---|---|---|---|---|---|
| Polymerization stage 1: | | | | | | | | |
| Xylene-soluble fraction [% by weight] | 0.5 | 0.9 | 0.6 | 0.9 | 0.6 | 0.8 | 0.5 | 0.8 |
| DSC melting point [° C.] | 168.1 | 166.1 | 167.8 | 165.9 | 167.7 | 166.0 | 168.1 | 166.1 |
| Productivity [g of polymer/g of titanium-containing solid component a)] | 34,800 | 21,700 | 31,200 | 20,900 | 30,600 | 20,100 | 29,500 | 20,700 |
| Polymerization stage 2: | | | | | | | | |
| TREF fractions | | | | | | | | |
| up to and incl. 80° C. [% by wt.] | 5.7 | 6.3 | 10.2 | 11.4 | 15.3 | 16.4 | 21.5 | 22.0 |
| 107° C. [% by wt.] | 13.1 | 24.1 | 11.3 | 26.0 | 13.5 | 27.0 | 15.8 | 24.5 |
| 112° C. [% by wt.] | 21.2 | 52.8 | 18.9 | 50.9 | 24.2 | 51.9 | 29.7 | 48.6 |
| 117° C. [% by wt.] | 36.6 | 9.9 | 35.7 | 7.0 | 29.3 | 2.9 | 18.2 | 3.0 |
| 122° C. [% by wt.] | 19.2 | 6.9 | 19.2 | 4.7 | 14.4 | 1.8 | 12.1 | 1.9 |
| 125° C. [% by wt.] | 4.2 | — | 4.7 | — | 3.3 | — | 2.7 | — |
| Fraction soluble in xylene at 80° C. (= elastomer fraction) [% by wt.] | 5.7 | 6.3 | 10.2 | 11.4 | 15.3 | 16.4 | 21.5 | 22.0 |
| Xylene-insoluble fraction at: | | | | | | | | |
| 80° C. (= matrix fraction) [% by wt.] | 94.3 | 93.7 | 89.8 | 88.6 | 84.7 | 83.6 | 78.5 | 78.0 |
| 107° C. [% by wt.] | 81.2 | 69.3 | 78.5 | 62.6 | 71.2 | 56.6 | 62.7 | 53.5 |
| 112° C. [% by wt.] | 60.0 | 16.8 | 59.6 | 11.7 | 47.0 | 4.7 | 33.0 | 4.9 |
| 117° C. [% by wt.] | 23.4 | 6.9 | 23.6 | 4.7 | 17.7 | 1.8 | 14.8 | 1.9 |
| 122° C. [% by wt.] | 4.2 | — | 4.7 | — | 3.3 | — | 2.7 | — |

TABLE 2-continued

|  | Example 1 | Comp. Ex. A | Example 2 | Comp. Ex. B | Example 3 | Comp. Ex. C | Example 4 | Comp. Ex. D |
|---|---|---|---|---|---|---|---|---|
| Proportion of the matrix which is insoluble in xylene at |  |  |  |  |  |  |  |  |
| 107° C. [% by wt.] | 86.1 | 74.0 | 87.4 | 70.7 | 84.1 | 67.7 | 79.9 | 68.6 |
| 112° C. [% by wt.] | 63.6 | 17.9 | 66.4 | 13.2 | 55.5 | 5.6 | 42.0 | 6.3 |
| 117° C. [% by wt.] | 24.8 | 7.4 | 26.3 | 5.3 | 20.9 | 2.2 | 18.9 | 2.4 |
| 122° C. [% by wt.] | 4.5 | — | 5.2 | — | 3.9 | — | 3.4 | — |
| MFR [g/10 min] | 15.0 | 15.3 | 1.8 | 2.0 | 3.5 | 3.7 | 5.1 | 5.4 |
| Tensile modulus of elasticity [N/mm$^2$] | 1780 | 1600 | 1620 | 1410 | 1210 | 1030 | 1030 | 900 |
| Notched impact strength at −20° C. [kJ/m$^2$] | 2.7 | 2.5 | 4.0 | 3.2 | 8.4 | 8.0 | 10.8 | 10.2 |
| Notched impact strength at −40° C. [kJ/m$^2$] | 0.9 | 0.7 | 2.1 | 1.8 | 6.6 | 6.5 | 8.8 | 8.5 |
| Chlorine content of the polymer [ppm] | 7.5 | 12.0 | 8.0 | 12.0 | 7.8 | 11.9 | 7.6 | 11.0 |

A comparison of the novel Examples 1 to 4 with the Comparative Examples A to D clearly shows that the novel propylene polymers have a significantly higher content of very highly isotactic fractions. They have a higher rigidity (tensile modulus of elasticity) in combination with a higher notched impact strength, ie. they have an improved ratio of rigidity to toughness. They also have a lower chlorine content.

We claim:

1. A process for the preparation of propylene polymers comprising from 50 to 90% by weight of a matrix comprising a propylene homopolymer comprising less than 2% by weight of polymer units of other alkenes, and from 8 to 50% by weight of an elastomeric copolymer of propylene and other alkenes, comprising form 20 to 85% by weight of propylene, wherein, by first dissolving the propylene polymers in boiling xylene, then cooling the solution at a cooling rate of 10° C./h to 25° C., and thereafter increasing the temperature, separating the propylene polymers into fractions of different solubility, the matrix which remains undissolved on heating the cooled propylene polymer solution to 80° C. fulfills one or more of the following conditions:

i) more than 20% by weight of the matrix remain undissolved on further heating to 112° C.;

ii) more than 8% by weight of the matrix remain undissolved on further heating to 117° C.; or iii) more than 1% by weight of the matrix remain undissolved on further heating to 122° C., and which process comprises in a first polymerization stage, polymerizing propylene at from 50 to 120° C. and from 15 to 40 bar to obtain a polypropylene, and subsequently in a second polymerization stage polymerizing a copolymer of propylene and other alk-1-enes of up to 10 carbon atoms on the polypropylene at from 30 to 100° C. and from 5 to 40 bar, wherein the polymerization is carried out in the presence of a Ziegler-Natta catalyst system comprising, as active components, a) a titanium-containing solid component, b) an aluminum compound and c) a first electrol donor compound, wherein, in the first polymerization stage, the molar ratio of the aluminum compound b) to the further electron donor compound c) is adjusted to a ratio of from 1.5:1 to 9:1, and wherein the titanium-containing component a) is obtained by reacting a titanium halide with a chloride-free compound of magnesium, an inorganic oxide carrier having a median diameter size of from 5 to 200 μm, a $C_1$–$C_8$-alkanol and a second electron donor compound by a procedure comprising a first stage and a second stage, said first stage comprising steps ($1^1$) to ($1^5$) wherein step ($1^1$) consists of forming a first mixture by adding a solution of the chlorine-free compound of magnesium in an inert solvent to the inorganic oxide carrier, step ($1^2$) consists of forming a second mixture by reacting the first mixture formed in step ($1^1$) for from 0.5 to 5 hours at from 10 to 120° C., and reacting the second mixture at from −20 to 80° C., with continuous mixing, with a $C_1$–$C_8$-alkanol in at least a 1.3-fold molar excess, based on the compound of magnesium, to form a chlorine-free intermediate, step ($1^3$) consists of adding the titanium halide and the second electron donor compound to the intermediate, step ($1^4$) consists of reacting the resulting mixture for at least 10 minutes at from 10 to 150° C. to give a solid substance, and step ($1^5$) consists of filtering off and washing the solid substance, and, said second stage comprising steps ($2^1$) and ($2^2$) wherein step ($2^1$) consists of extracting the washed solid substance obtained in the first stage in an inert solvent which contains at least 5% by weight of titanium tetrachloride, and step ($2^2$) consists of washing the extracted solid substance with a liquid alkane.

2. The process of claim 1, wherein pressure of the second polymerization stage it at least 3 bar below the pressure of the first polymerization stage.

3. The process of claim 1, wherein, by first dissolving the propylene polymers in boiling xylene, then cooling the solution at a cooling rate of 10° C. /h to 25° C., and thereafter increasing the temperature, separating the propylene polymers into fractions of different solubility, the matrix which remains undissolved on heating the cooled propylene polymer solution to 80° C. fulfills one or more of the following conditions:

i) more than 30% by weight of the matrix remain undissolved on further heating to 112° C.;

ii) more than 12% by weight of the matrix remain undissolved on further heating to 117° C.; or iii) more than 2% by weight of the matrix remain undissolved on further heating to 122° C.

4. The process of claim 1, wherein, in the first polymerization stage, the molar ratio of the aluminum compound b) to the further electron donor compound c) is adjusted to a ratio of from 2:1 to 8:1.

5. The process of claim 1, wherein the titanium containing solid component a) is prepared using, as carrier, an inorganic oxide which has a pH of from 1 to 6.5, and cavities or channels with an average diameter of from 1 to 20 μm, whose macroscopic volume fraction is from 5 to 30%, based on the total particle.

6. The process of claim 1, wherein a silica gel is used as the inorganic oxide in the preparation of the titanium-containing solid component a).

7. The process of claim 1, wherein a trialkylaluminum compound whose alkyl groups are each of 1 to 8 carbon atoms is used as the aluminum compound b).

8. The process of claim 1, wherein at least one orgnao-silicon compound of the formula (I)

    (I)

where the radicals $R^1$ are identical or different and are each $C_1$–$C_{20}$-alkyl, 5- to 7-membered cycloalkyl which in turn may be substituted by $C_1$–$C_{10}$-alkyl, or $C_6$–$C_{18}$aryl-$C_1$–$C_{10}$-alkyl, the radicals $R^2$ are identical or different and are each $C_1$–$C_{20}$-alkyl and $n$ is the integer 1, 2, or 3, is used as a further electron donor compound.

9. The process of claim 1, wherein the polymerization in the second polymerization stage is carried out in the presence of a $C_1$–$C_8$-alkanol.

10. A propylene polymer obtained by the process defined in claim 1.

11. A film, fiber or molding comprising the propylene polymer defined in claim 10.

12. The process of claim 1, wherein the median diameter size of the inorganic oxide carrier is up to 100 μm.

13. The process of claim 1, wherein the median diameter size of the inorganic oxide carrier is from 15 to 100 μm.

14. The process of claim 1, wherein the median diameter size of the inorganic oxide carrier is up to 70 μm.

15. The process of claim 13, wherein the median diameter size of the inorganic oxide carrier is up to 70 μm.

16. The process of claim 1, wherein the median diameter size of the inorganic oxide carrier is from 20 to 70 μm.

17. The process of claim 9, wherein the $C_1$–$C_8$-alkanol and the aluminum compound b) are present in the second polymerization stage in a ratio of from 0.01:1 to 10:1.

18. The process of claim 9, wherein the $C_1$–$C_8$-alkanol and the aluminum compound b) are present in the second polymerization stage in a ratio of from 0.02:1 to 5:1.

19. The process of claim 1, wherein the second polymerization stage is carried out in a multistage gas-phase process.

20. The process of claim 19, wherein the multistage process is a two-stage process.

* * * * *